(12) United States Patent
Lee et al.

(10) Patent No.: US 8,310,092 B2
(45) Date of Patent: Nov. 13, 2012

(54) OUTDOOR ELECTRICAL POWER RECEPTACLE AND CONTROL SYSTEM THEREOF

(75) Inventors: Yu-Lung Lee, Nanjhuang Township, Miaoli County (TW); Jung-Hui Hsu, Sinjhuang (TW)

(73) Assignee: Powertech Industrial Co., Ltd., Chung Ho (TW)

( * ) Notice: Subject to any disclaimer, the term of this patent is extended or adjusted under 35 U.S.C. 154(b) by 258 days.

(21) Appl. No.: 12/726,715

(22) Filed: Mar. 18, 2010

(65) Prior Publication Data

US 2011/0156496 A1 Jun. 30, 2011

(30) Foreign Application Priority Data

Dec. 31, 2009 (TW) ................................ 98146193 A

(51) Int. Cl.
*H02J 3/14* (2006.01)
(52) U.S. Cl. .............................. 307/38; 307/115; 174/66
(58) Field of Classification Search .................... 307/38, 307/39, 40, 115; 174/50.52, 66
See application file for complete search history.

(56) References Cited

U.S. PATENT DOCUMENTS

| | | | | |
|---|---|---|---|---|
| 4,381,063 | A * | 4/1983 | Leong | 220/242 |
| 6,731,024 | B1 * | 5/2004 | Molnar et al. | 307/147 |
| 2008/0309164 | A1 * | 12/2008 | Lim | 307/39 |
| 2009/0236910 | A1 * | 9/2009 | Yamada et al. | 307/40 |

* cited by examiner

*Primary Examiner* — Carlos Amaya
(74) *Attorney, Agent, or Firm* — C. G. Mersereau; Nikolai & Mersereau, P.A.

(57) ABSTRACT

Disclosed is an outdoor electrical power receptacle, comprising a main body, a mounting member, and an extension power cord, wherein an upper end of the mounting member couples to the main body. The extension power cord, couples to each of controllable power outlets disposed on the main body and extended out of the main body for connecting to an external power source. Herein, the main body further includes a power switching module, a wireless transceiver, and a microprocessor. The power switching module couples to each controllable power outlet. The wireless transceiver receives a control signal. The microprocessor coupled to the wireless transceiver and the power switching module, drives the power switching module so as to control each of the controllable power outlets to be conducted in response to the control signal. A control system of the outdoor electrical power receptacle according to the present invention is also provided.

18 Claims, 4 Drawing Sheets

OUTDOOR ELECTRICAL POWER RECEPTACLE AND CONTROL SYSTEM THEREOF

BACKGROUND OF THE INVENTION

1. Field of the Invention

The present invention relates to an outdoor electrical power receptacle and a control system thereof, and more particularly, to an outdoor electrical power receptacle and a control system thereof which are controlled by a remote control apparatus.

2. Description of Related Art

Take outdoor lighting an example for illustration, electrical power receptacles with extension power cords must be placed outdoor to provide electrical connection for outdoor lighting devices. When users want to turn off the outdoor lighting devices, they must go to the outdoor and turn off power switches disposed on the electrical power receptacles, for achieving the objective of turning off lights. If the users want to turn on the outdoor lighting devices, similarly, they must go to the outdoor area and turn on the power switches of the electrical power receptacles mentioned earlier for achieving the objective of turning on the lights.

As such, the conventional electrical power receptacles with extension power cords for providing the supply of electrical power in outdoor areas are inconvenience of use because the users must go between the outdoor areas and the indoor areas to perform power switching control of the electrical power receptacles.

SUMMARY OF THE INVENTION

In view of the aforementioned issues, the present invention provides an outdoor electrical power receptacle and a control system thereof, in which at least one outdoor electrical power receptacle has functionalities of transmitting and receiving signals. As per the aforementioned receiving signals function, the outdoor electrical power receptacle may be controlled by a remote control apparatus directly or indirectly with respect to a timing schedule and further has a light sensing function. Additionally, as per the aforementioned transmitting signals function, the outdoor electrical power receptacle may transmit any related information regarding the surrounding environments, e.g. a switching state, a temperature and humidity state, a lighting state, or a weather condition state, etc., back the remote control apparatus and demonstrate the aforementioned information on the remote control apparatus.

In order to further understand the techniques, means and effects the present invention, the following detailed description and included drawings are hereby referred, such that, through which, the purposes, features and aspects of the present invention can be thoroughly and concretely appreciated; however, the included drawings are provided solely for reference and illustration, without any intention to be used for limiting the present invention.

DETAILED DESCRIPTION OF THE PREFERRED EMBODIMENTS

Figure 1A:
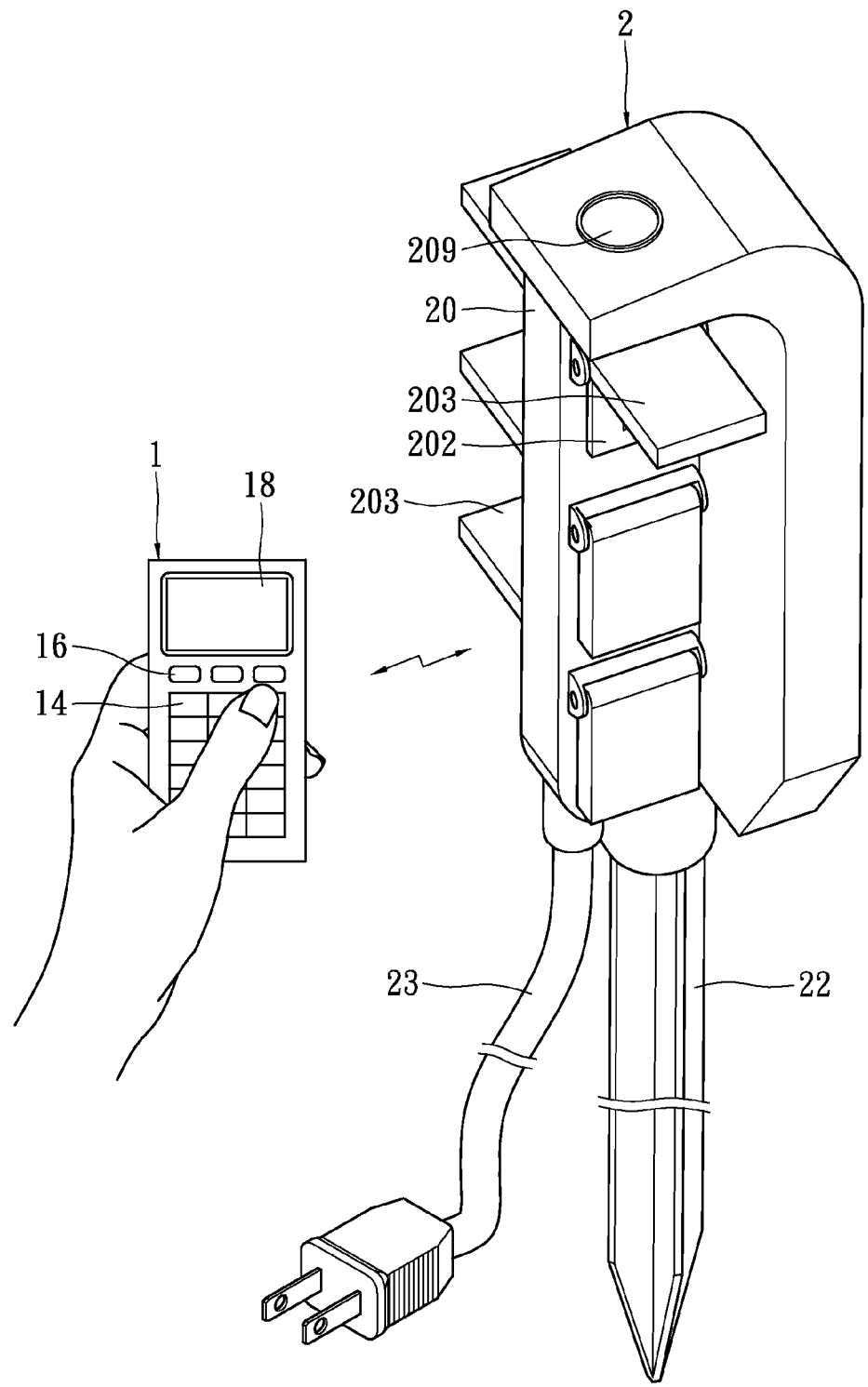
FIG. 1A illustrates a schematic diagram of an embodiment according to the present invention.

Please refer to FIG. 1A, in which a schematic diagram of an embodiment according to the present invention is demonstrated. A control system of an outdoor electrical power receptacle comprises a remote control apparatus 1 and at least one outdoor electrical power receptacle 2. Wherein, the remote control apparatus 1 includes an operating unit 14, a mode setup unit 16, and a display unit 18. Meanwhile, each outdoor electrical power receptacle 2 includes a main body 20, a mounting member 22, and an extension power cord 23. The main body 20 has at least one controllable power outlet 202 and at least one flip cover 203. Each of the flip covers 203 is used to open or close to positions in accordance with each of the corresponding controllable power outlets 202. As such, the design of the flip cover 203 is capable of protecting each of the corresponding controllable power outlets 202, thereby preventing defects or damages caused by sunlight or rain.

As per the aforementioned embodiment, the mounting member 22 is primarily provided to install the outdoor electrical power receptacle 2 in outdoor areas. Therefore, in response to different conditions and circumstances of a variety of outdoor environments, the mounting member 22 may be designed as a cone-shape structure, a tripod structure, or a sucker structure.

Figure 1B:
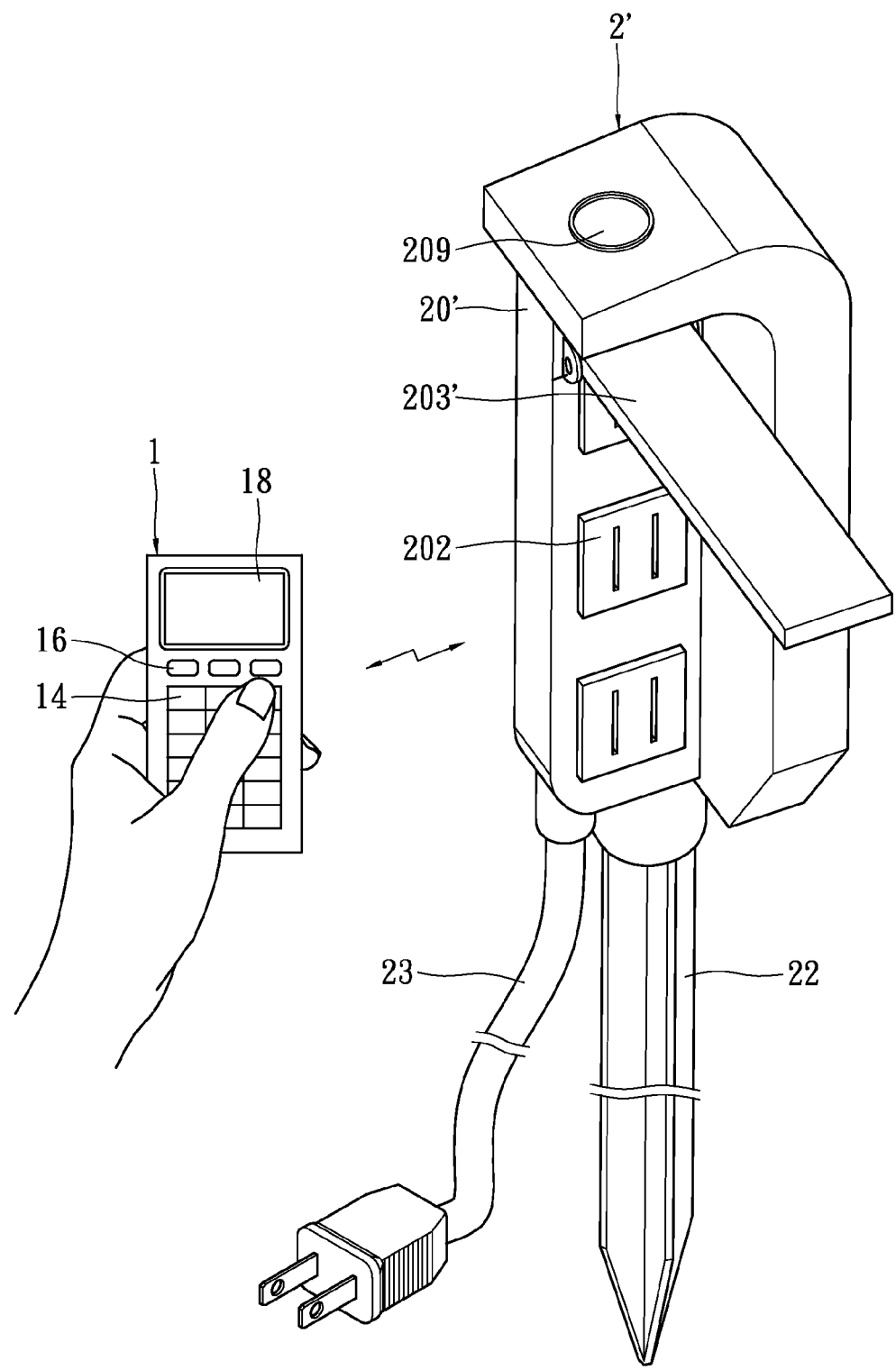
FIG. 1B illustrates a schematic diagram of another embodiment in accordance with certain aspects of the present invention.

As shown in FIG. 1B, the flip cover 203' pivoted with the main body 20' of the outdoor electrical power receptacle 2' may be designed for protecting the plurality of controllable power outlets 202. Herein, the flip cover 203' is used to open or close to positions in accordance with the corresponding controllable power outlets 202. Hence, the design objective of the flip covers 203' is to protect the corresponding controllable power outlets 202, such that defects and damages caused by sunlight or rain may be prevented or minimized. Please refer again FIG. 1A. The mode setup unit 16 of the remote control apparatus 1 is used to control remote modes of each outdoor electrical power receptacle 2, wherein the remote modes includes a direct remote mode, a timing remote mode, or an automatically light-sensing mode. In the direct remote mode, the remote control apparatus 1 may control wirelessly and directly each controllable power outlet 202 of each outdoor electrical power receptacle 2 to supply electrical power or not by ways of the operating unit 14. Additionally, in the timing remote mode, the remote control apparatus may wirelessly control each controllable power outlet 202 of each outdoor electrical power receptacle 2 to supply power for a specific period or stop to supply power for a certain period by ways of the operating unit 14. As a result, users are not necessary to go to the outdoor areas to operate each outdoor electrical power receptacle 2 by means of wireless remote control.

Moreover in the automatically light-sensing mode, the remote control apparatus 1 may stop to be able to wirelessly control each controllable power outlet 202 of each outdoor electrical power receptacle 2. A photon detector module 209 installed in each outdoor electrical power receptacle 2 is capable of sensing the light emission intensity and then generating a detected result. The controllable power outlets 202 may self-control to supply electrical power or not in response to the detected result of the photon detector module 209.

In the automatically light-sensing mode, is the external environment is in a dark circumstance, each outdoor electrical power receptacle 2 may self control the controllable power outlets 202 to supply power so as to turn on electronic devices (not shown) which are connected to the controllable power outlets 202, thereby attaining auto turn-on effect for the electronic devices. Subsequently, if the external environment is in a bright circumstance, each outdoor electrical power receptacle 2 may self-control the controllable power outlets 202 to stop supply power so as to turn off the electronic devices which are connected to the controllable power outlets 202, thereby attaining auto turn-off effect for the electronic devices.

The remote control apparatus 1 may further receive the state of each outdoor electrical power receptacle 2, states of surrounding environment thereof, and relevant information, e.g. the operating state of each controllable power outlet, the switching state, the temperature and humidity state, the lighting state, the weather condition state, and etc. The display unit 18 of the remote control apparatus 1 is used to display the remote modes of each outdoor electrical power receptacle 2, the operation state of the operating unit 14, the switching state of each controllable power outlet 202, and the states of surrounding environments thereof. The aforementioned display unit 18 may be formed by organic light emitting diodes (OLEDs) or light emitting diodes (LEDs). The display unit 18 may be a liquid crystal display (LCD) or a seven segment display.

The extension power cord 23 extended out of the main body 20 of each of the outdoor electrical power receptacles 2 and coupled to each of the controllable power outlets 202 of the main body 20. Meanwhile, the extension power cord 23 may connect to public electrical power sockets (not shown) or other power sockets for receiving public electrical power. In addition, the cone-shape mounting member 22 of the outdoor electrical power receptacle 2 has an upper end (not shown) and a cone end (not shown, wherein the upper end connects to the main body 20 and the cone end is plugged into the ground, such that the main body 20 is mounted on the ground. Thus, the main purpose for designing the cone-shape mounting member 22 is to attain each outdoor electrical power receptacle 2 on the ground unmovable.

Figure 2:
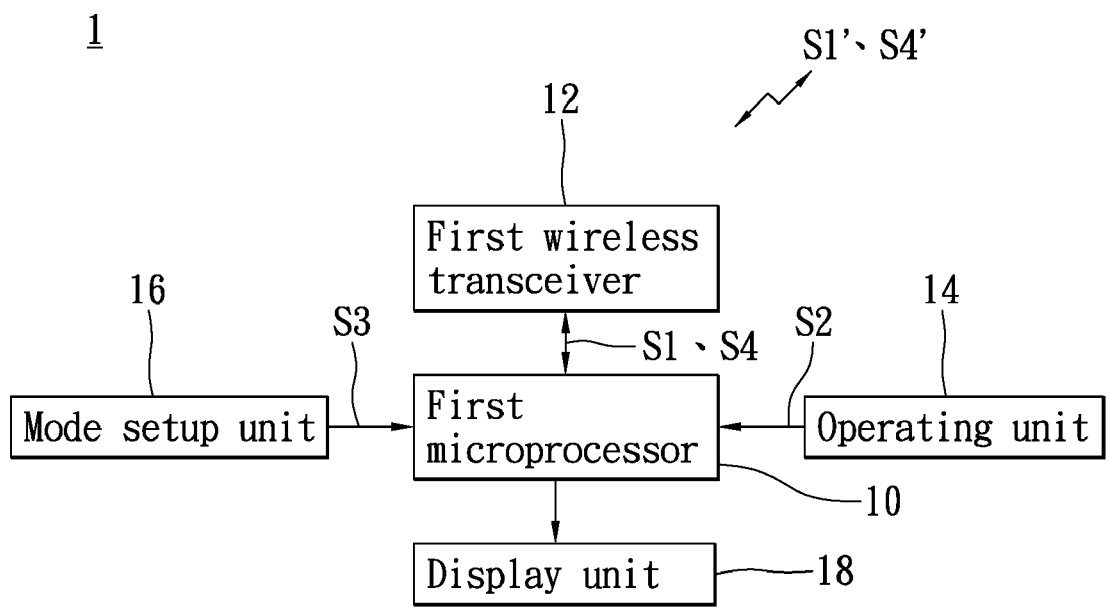
FIG. 2 illustrates a circuit block diagram of an embodiment of the remote control apparatus in accordance with certain aspects of the present invention.

Please refer to FIG. 2 in conjunction with FIG. 1A, in which a circuit block diagram of an embodiment of the remote control apparatus in accordance with certain aspects of the present invention is demonstrated. As shown in FIG. 2, the remote control apparatus 1 comprises a first microprocessor 10, a first wireless transceiver 12, an operating unit 14, a mode setup unit 16, and a display unit 18. Therein, the first microprocessor 10 couples to the first wireless transceiver 12, the operating unit 14, the mode setup unit 16, and the display unit 18. The first microprocessor 10 receives a setup signal S3 from the mode setup unit 16 and executes a direct remote mode, a timing remote mode, or an automatically light-sensing mode in response to the setup signal S3. The first microprocessor 10 may further receive an operating signal S2 from the operating unit 14 and output a control signal S1 to the first wireless transceiver 12 in response to the operating signal S2. The first wireless transceiver 12 may code the control signal S1 into a radio frequency control signal S1' and transmit the radio frequency control signal S1' to each of the outdoor electrical power receptacles 2 remotely.

As shown in FIG. 2, as the setup signal S3 outputted from the mode setup unit 16 manages the remote control apparatus 1 to be in the direct remote mode, the operating unit 14 may operate to transmit the operating signal S2 to the first microprocessor 10. The first microprocessor 10, in the direct remote mode, outputs the control signal 51 to the first wireless transceiver 12 with respect to the operating signal S1 and transmits the radio frequency control signal S1' to a specific outdoor electrical power receptacle 2 remotely from the wireless transceiver 12, so as to control wirelessly and directly each of the controllable power outlets 202 of the specific outdoor electrical power receptacle 2 to supply electrical power or not. Moreover, the users may get the control modes of the remote control apparatus 1, the operation state of the operating unit 14, and the switching state of each controllable power outlet 202 disposed on the specific outdoor electrical power receptacle 2 from the display unit 18 of the remote control apparatus 1.

Furthermore, as the setup signal S3 outputted from the mode setup unit 16 manages the remote control apparatus 1 to be in the timing remote mode, the operating unit 14 may function to transmit the operating signal S2 to the first microprocessor 10. The first microprocessor 10, in the timing remote mode, outputs the control signal S1 to the first wireless transceiver 12 with respect to the operating signal S1 and transmits the radio frequency control signal S1' to a specific outdoor electrical power receptacle 2 remotely from the wireless transceiver 12, so as to control wirelessly and directly each of the controllable power outlets 202 of the specific outdoor electrical power receptacle 2 to supply electrical power for a certain fixed timing or stop supply electrical power for another fixed timing. Moreover, the users may get the control modes of the remote control apparatus 1, the operation state of the operating unit 14, and the switching state of each controllable power outlet 202 disposed on the specific outdoor electrical power receptacle 2 from the display unit 18 of the remote control apparatus 1.

Additionally, as the setup signal S3 outputted from the mode setup unit 16 manages the remote control apparatus 1 to be in the automatically light-sensing mode, the operating unit 14 may function to transmit the operating signal S2 to the first microprocessor 10. The first microprocessor 10, in the automatically light-sensing mode, outputs the control signal 51 to the first wireless transceiver 12 with respect to the operating signal 51 and transmits the radio frequency control signal S1' to a specific outdoor electrical power receptacle 2 remotely or to all outdoor electrical power receptacles 2 from the wireless transceiver 12, so as to stop the remote control function associated with each controllable power outlet 202 of each outdoor electrical power receptacle 2. The photon detector module 209 installed in each outdoor electrical power receptacle 2 is capable of sensing the light emission intensity and then generating a detected result. The controllable power outlets 202 may self-control to supply electrical power or not in response to the detected result of the photon detector module 209.

Figure 3:
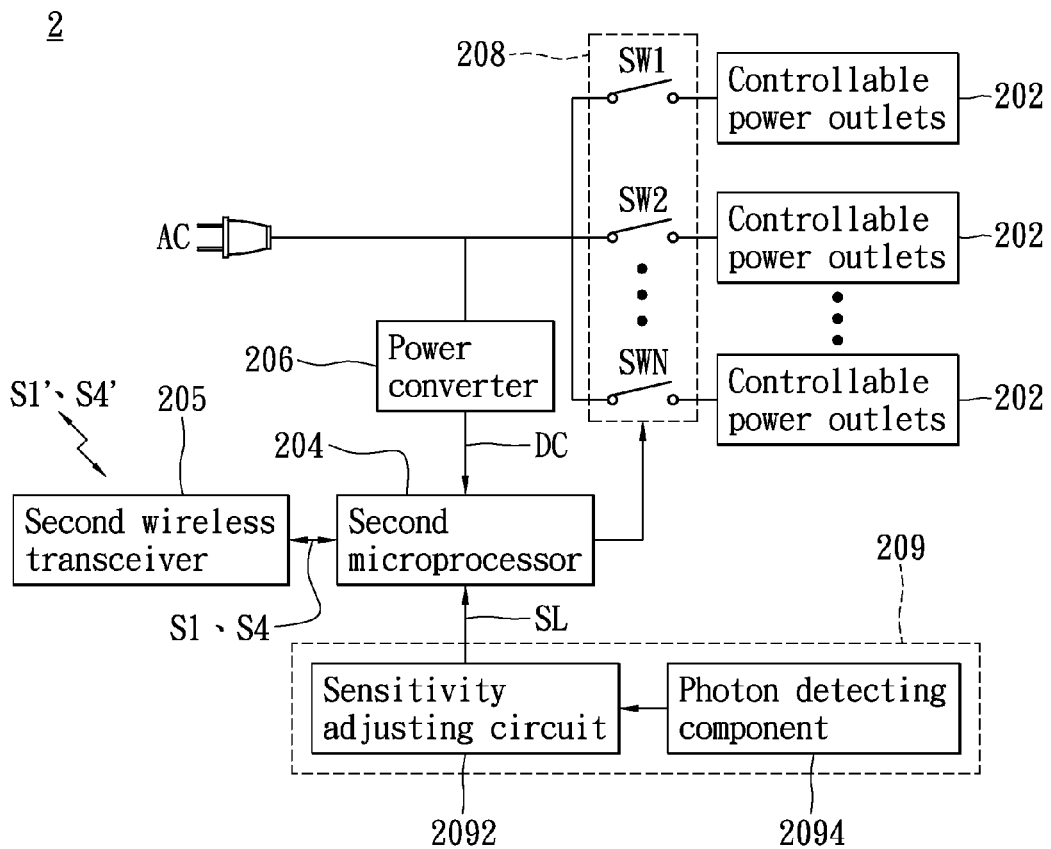
FIG. 3 illustrates a circuit block diagram of an embodiment of the outdoor electrical power receptacle in accordance with certain aspects of the present invention.

Finally, please refer to FIG. 3 in conjunction with FIG. 2, in which a circuit block diagram of an embodiment of the outdoor electrical power receptacle in accordance with certain aspects of the present invention is demonstrated. The structural features of the outdoor electrical power receptacle 2 are the same as that of FIG. 1.

In FIG. 3, the circuitry of outdoor electrical power receptacle 2 is primarily disposed inside the main body 20. The circuitry includes at least one controllable power outlet 202, a second microprocessor 204, a second wireless transceiver 205, and a power switching module 208, wherein the power switching module couples between each of the controllable power outlets 202 to the public AC power. The second microprocessor 204 couples between the second wireless transceiver 205 and the power switching module 208. The aforementioned power switching module 208 has at least one of switches SW1, SW2, . . . SWN, for controlling the controllable power outlets 202. The switch above-mentioned may be a relay or a TRIAC.

As such, the outdoor electrical power receptacle 2 wirelessly receives the radio frequency control signal S1 from the remote control apparatus by the second wireless transceiver 205, decodes the radio frequency control signal S1 to the control signal S1, and then transmits the control signal S1 to the second microprocessor 204. the second microprocessor 204 receives the control signal S1 from the wireless transceiver 205, drives the switches SW1, SW2 . . . SWN of the power switching module 208 to turn on or off in response to the control signal S1, and then further conducts the public AC power to the controllable power outlets 202 correspondingly or cuts off the public AC power, so as to control the corresponding controllable power outlets 202 to either supply electrical power to the electronic devices or not.

The outdoor electrical power receptacle 2 further includes a power converter 206 which converts the public AC power to a DC power and provides the DC power to the second microprocessor 24.

The outdoor electrical power receptacle further include s photon detector module 209, wherein the photon detector module 29 couples to the second microprocessor 204. The photon detector module 209 includes a sensitivity adjusting circuit 2092 and a photon detecting component 2094, wherein the sensitivity adjusting circuit 2092 couples to the second microprocessor 204 and the photon detecting component 2094. The photon detecting component 2094 is used to sense light emission intensity. The sensitivity adjusting circuit 2092 is used to modulate the photon sensitivity of the photon detecting component 2094 and then output an electrical signal SL. Herein the photon detecting component 2094 may be a cadmium sulfide (CDS) light sensitive resistor or other detectors.

The second microprocessor 204 coupled to the light detector module 209 receives the electrical signal SL, drives the switches SW1, SW2 . . . SWN of the power switching module 208 to turn on or off in response to the electrical signal SL, and then further conducts the public AC power to the controllable power outlets 202 correspondingly or cuts off the public AC power, so as to control the corresponding controllable power outlets 202 to either supply electrical power to the electronic devices or not.

As the remote control apparatus 1 is set in the direct remote mode, the users may wirelessly control each controllable power outlet 202 of the outdoor electrical power receptacle 2 to supply electrical power or not directly thru the operating unit 14. Meanwhile, as the remote control apparatus 1 is set in the timing remote mode, the users may wirelessly control each controllable power outlet 202 of the outdoor electrical power receptacle 2 to supply electrical power for a certain time or stop supply electrical power for another period thru the operating unit 14. Additionally, as the remote control apparatus 1 is set in the automatically light-sensing mode, the remote control apparatus 1 may not wirelessly control the outdoor electrical power receptacle 2 and the electrical power supplied to each of the controllable power outlets 202 on the outdoor electrical power receptacle 2 is controlled with respect to the detected result of light emission intensity.

The second microprocessor 204 in the each of the outdoor electrical power receptacles 2 does not merely receive the states of the power outlets and light but also receive the status signals associated with the surrounding environments of the outdoor electrical power receptacles 2, e.g. the switching signals, the operating status signals, the temperature and humidity status signals, or the weather condition status signals from a variety of environmental detectors (not shown). Either one or a combination of the switching signals, the operating status signals, the temperature and humidity status signals, or the weather condition status signals is represented as a status signal S4. The second microprocessor 205 transmits the status signal S4 to the second wireless transceiver 205. The second wireless transceiver 205 codes the status signal S4 into a radio frequency status signal S4' and transmits it to the remote control apparatus 1 wirelessly.

The remote control apparatus 1 wirelessly receives the radio frequency status signal S4' from the remote end of outdoor electrical power receptacles 2 and decodes the radio frequency status signal S4' into the status signal S4 by means of the first wireless transceiver 12. The first microprocessor 10 receives the status signal S4 from the first wireless transceiver 12 and outputs the status signal S4 to the display unit 18, so as to allow the users to get an idea how the switching state and surrounding environmental state associated with each of the electrical power receptacles 2 are.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. An outdoor electrical power receptacle, comprising:
a main body (20), including:
    a vertically elongated outlet housing portion having a top end and a bottom end, including at least one controllable power outlet exposably disposed therein,
    a protective portion shieldingly coupled to the outlet housing portion covering at least the top end of the outlet housing portion;
    wherein the protective portion is substantially an inverted L-shaped structure having a width wider than that of the outlet housing portion,
    wherein the protective portion has at least one chamfered edge arranged along the width thereof;
a mounting member (22) extending from the bottom end of the outlet housing portion;
a power switching module, coupled to the controllable power outlet;
a wireless transceiver, for receiving a control signal;
a microprocessor, coupled to the wireless transceiver and the power switching module, for driving the power switching module to control the controllable power outlet to be in a conduction state or in a cutoff state in response to the control signal; and
an extension power cord, coupled to the controllable power outlet and extending out of the main body, for connecting to an external power source.

2. The outdoor electrical power receptacle according to claim 1, wherein the outlet housing portion has a plurality of controllable power outlets; the receptacle further including a plurality of flip covers pivotably coupled to the main body, wherein each flip cover is selectively retainable in an open and a closed positions with respect to each of the controllable power outlets correspondingly.

3. The outdoor electrical power receptacle according to claim 1, wherein the outlet housing portion has a plurality of controllable power outlets; the receptacle, the receptacle further including at least one flip cover pivotably coupled to the main body, wherein each flip cover is selectively retainable in an open and a closed positions with respect to more than one of the controllable power outlets correspondingly.

4. The outdoor electrical power receptacle according to claim 1, wherein the mounting member is a cone shape member, a tripod, or a sucker.

5. The outdoor electrical power receptacle according to claim 1, wherein the microprocessor controls the controllable power outlet outlets to be in the conduction state or in the cutoff state in response to the control signal directly or indirectly with respect to a timing schedule.

6. The outdoor electrical power receptacle according to claim 5, wherein the main body further includes a photon detecting module, coupled to the microprocessor, for sensing a light intensity so as to output an electrical signal to the microprocessor.

7. The outdoor electrical power receptacle according to claim 6, wherein the photon detecting module includes a photon detecting component and a sensitivity adjusting circuit, in which the sensitivity adjusting circuit is coupled to the microprocessor and the photon detecting component, and the sensitivity adjusting circuit is used to adjust the photon sensitivity of the photon detecting component so as to output the electrical signal.

8. The outdoor electrical power receptacle according to claim 1, wherein the microprocessor further outputs a status signal to the wireless transceiver which transmits the status signal to remote end, in which the status signal is either one or a combination of a switch status signal, a temperature and humidity status signal, a light status signal, a weather condition status signal, a number of electrical power receptacles status signal, or a operating status signal.

9. A control system of an outdoor electrical power receptacle, comprising:
  a remote control apparatus, including:
    an operating unit, for outputting a operating signal;
    a first microprocessor, coupled to the operating unit, for outputting a control signal in response to the operating signal;
    a first wireless transceiver, coupled to the first microprocessor, for transmitting the control signal; and
  at least one outdoor electrical power receptacle, comprising:
    a main body, including:
      a vertically elongated outlet housing portion having a top end and a bottom end, including at least one controllable power outlet exposably disposed therein,
      a protective portion shieldingly coupled to the outlet housing portion covering at least the top end of the outlet housing portion;
      wherein the protective portion is substantially an inverted L-shaped structure having a width wider than that of the outlet housing portion,
      wherein the protective portion has at least one chamfered edge arranged along the width thereof;
    a mounting member (23) extending from the bottom end of the outlet housing portion;
    a power switching module, coupled to the controllable power outlet;
    a second wireless transceiver, for receiving the control signal;
    a second microprocessor, coupled to the second wireless transceiver and the power switching module, for driving the power switching module to control the controllable power outlet to be in a conduction state or in a cutoff state in response to the control signal;
    and an extension power cord, coupled to the controllable power outlet and extending out of the main body, for connecting an external power source.

10. The control system of the outdoor electrical power receptacle according to claim 9, wherein the outlet housing portion has a plurality of controllable power outlets; the receptacle further including a plurality of flip covers pivotably coupled to the main body, wherein each flip cover is selectively retainable in an open and a closed positions with respect to each of the controllable power outlets correspondingly.

11. The control system of the outdoor electrical power receptacle according to claim 9, wherein the outlet housing portion has a plurality of controllable power outlets; the receptacle, the receptacle further including at least one flip cover pivotably coupled to the main body, wherein each flip cover is selectively retainable in an open and a closed positions with respect to more than one of the controllable power outlets correspondingly.

12. The control system of the outdoor electrical power receptacle according to claim 9, wherein the second microprocessor further outputs a status signal, the second wireless transceiver transmits the status signal to the first wireless transceiver, and the first wireless transmits the status signal to the second microprocessor, in which the status signal is either one or a combination of a switch status signal, a temperature and humidity status signal, a light status signal, a weather condition status signal, a number of electrical power receptacles status signal, or a operating status signal.

13. The control system of the outdoor electrical power receptacle according to claim 12, wherein the remote control apparatus further including a mode setup unit, coupled to the first microprocessor, for outputting a setup signal to the first microprocessor.

14. The control system of the outdoor electrical power receptacle according to claim 13, wherein the first microprocessor executes a direct remote mode, a timing remote mode, or an automatically light-sensing mode in response to the setup signal.

15. The control system of the outdoor electrical power receptacle according to claim 13, wherein the remote control apparatus further includes a display unit, which is coupled to the first microprocessor, for displaying either one or a combination of the setup state, the operating state of each controllable power outlet, the switching state, the temperature and humidity state, the lighting state, the weather condition state, the number of electrical power receptacles, or the operating state of the electrical power receptacle.

16. The control system of the outdoor electrical power receptacle according to claim 9, wherein the second microprocessor controls the controllable power outlet to be in the conduction state or in the cutoff state in response to the electrical signal directly or indirectly with respect to a timing schedule.

17. A control system of an outdoor electrical power receptacle, comprising:
  a remote control apparatus, including:
    an operating unit, for outputting a operating signal;
    a first microprocessor, coupled to the operating unit, for outputting a control signal in response to the operating signal;
    a first wireless transceiver, coupled to the first microprocessor, for transmitting the control signal; and
  at least one outdoor electrical power receptacle, comprising:
    a main body, including:

a vertically elongated outlet housing portion having a top end and a bottom end, including at least one controllable power outlet exposably disposed therein, a protective portion shieldingly coupled to the outlet housing portion covering at least the top end of the outlet housing portion;

a photon detecting module for sensing a light intensity so as to generate an electrical signal;

wherein the protective portion is substantially an inverted L-shaped structure having a width wider than that of the outlet housing portion, wherein the protective portion has at least one chamfered edge arranged along the width thereof;

a mounting member (23) extending from the bottom end of the outlet housing portion;

a power switching module, coupled to the controllable power outlet;

a second wireless transceiver, for receiving the control signal;

a second microprocessor, coupled to the second wireless transceiver, the power switching module, and the photon detecting module, for driving the power switching module to control the controllable power outlet to be in a conduction state or in a cutoff state in response to the control signal and the electrical signal directly or indirectly with respect to a timing schedule; and an extension power cord, coupled to the controllable power outlet and extending out of the main body, for connecting an external power source.

18. The control system of the outdoor electrical power receptacle according to claim 17, wherein the photon detecting module includes a photon detecting component and a sensitivity adjusting circuit, in which the sensitivity adjusting circuit is coupled to the second microprocessor and the photon detecting component, and the sensitivity adjusting circuit is used to adjust the photon sensitivity of the photon detecting component so as to output the electrical signal.

* * * * *